Aug. 29, 1939.    J. ABEL    2,170,888
POWERED CROSS FEED FOR LATHES
Filed April 21, 1938
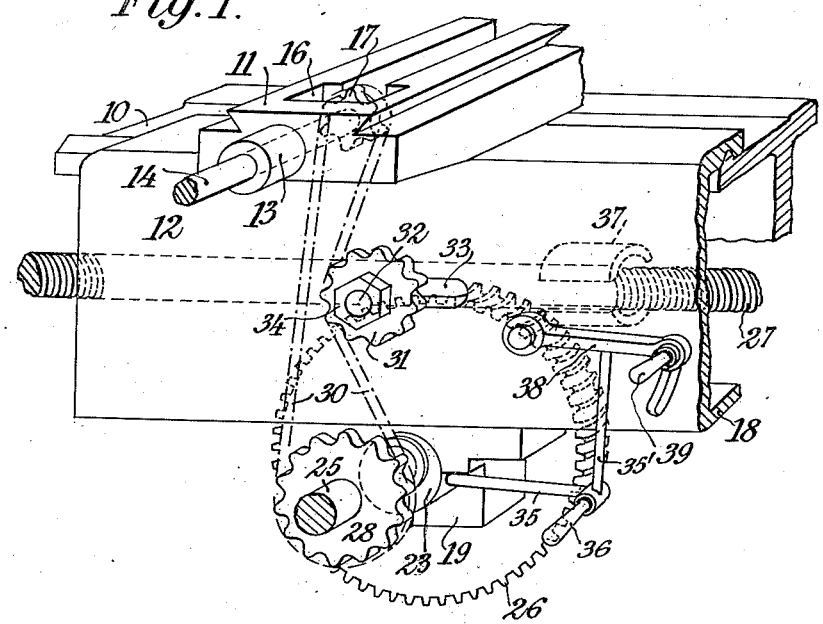
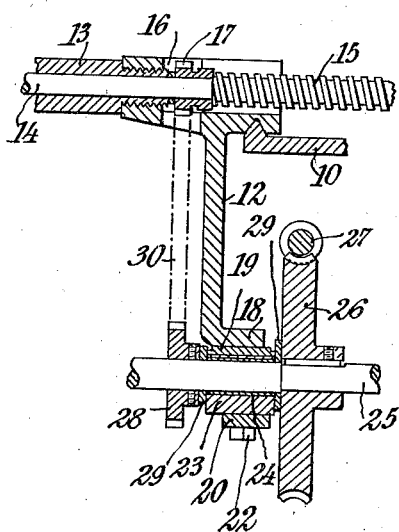
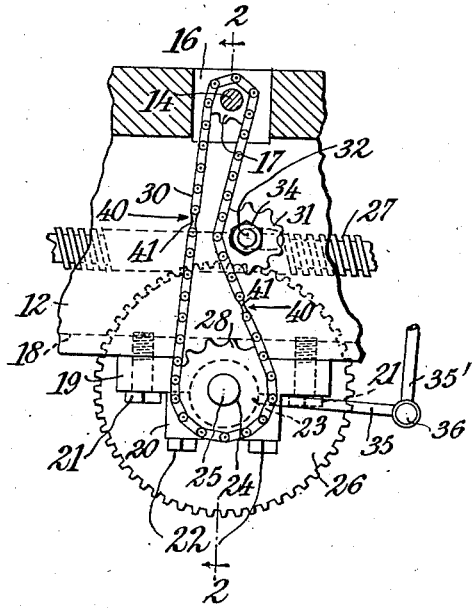
INVENTOR
Jack Abel,
BY
A. Engel
ATTORNEY Patented Aug. 29, 1939

2,170,888

UNITED STATES PATENT OFFICE 2,170,888

POWERED CROSS FEED FOR LATHES

Jack Abel, Elmhurst, N. Y.

Application April 21, 1938, Serial No. 203,386

7 Claims. (Cl. 82—23)

My present invention relates to lathes or the like, and more particularly to means for providing a powered cross feed for such machines.

In all powered cross feeds for lathes with which I am familiar, power for the cross feed spindle is obtained through a train of gears, usually four or more, at least one of which is mounted to be manually shifted and locked into mesh with another gear which is rotated from a power source, usually a worm mounted for rotation on the lead screw of the lathe. The mountings for these gear trains and the devices for shifting the gears into and out of mesh and ofttimes both, are costly to produce and add materially to the price of the lathe. Also should anything go wrong with the cross feed operation or should some part of the machine which serves the cross feed jam, a severe strain is placed upon the gear train with the result that the teeth of one or more of the gears are thereby stripped.

My invention seeks to simplify the construction and to substantially reduce the cost of the means for power driving the cross feed spindle of a lathe and also contemplates the provision of means for preventing damage to the lathe in the event of jamming of the cross feed operating mechanism from any cause whatsoever. A further object is to provide a simple means of converting a lathe having a conventional non-powered cross feed into a powered cross feed. A further object is to so correlate the control means for the powered cross feed with the movement of the tool carriage that when said control means are in use it will be impossible to drive the tool carriage longitudinally of the lathe bed and vice versa.

According to a preferred embodiment of my invention, the power for driving the cross feed spindle is derived from the lead screw by moving an eccentrically mounted worm gear into mesh with said lead screw and transmitting the rotation of the worm wheel shaft to the spindle of the cross feed by a flexible positive belt drive means. The foregoing and other features of novelty of my invention will be more apparent from the detailed description which follows when considered in conjunction with the accompanying drawing, wherein:

Figure 1 is an oblique view of a portion of a lathe showing my invention applied thereto.

Fig. 2 is a section taken substantially along the plane of the line 2—2 of Fig. 3.

Fig. 3 is a front elevation of the tool carriage with parts broken away.

Referring to the drawing, let the reference numeral 10 indicate a portion of the bed of a lathe upon which a tool carriage 11 having a depending apron 12 is longitudinally movable. Screw threadedly mounted in the forward end of the tool carriage is a bushing 13 through which extends a cross feed spindle 14, the rear portion of which is somewhat enlarged and screw threaded as indicated at 15. The tool carriage 11 is formed with an opening 16 vertically therethrough and firmly mounted on the spindle 14 so as to be disposed in the opening 16 is a small toothed wheel 17 which is held firmly on said spindle between a shoulder formed adjacent an end of the enlarged screw threaded portion 15 and the inner end of the bushing 13.

The apron 12 at its lower edge is formed with a rearwardly directed flange 18 to the under face of which is secured a two-part bearing block 19, 20, the portion 19 of which is held to the flange 18 by bolts 21 and the portion 20 of which is held to the portion 19 by bolts 22. Mounted within the bearing block 19, 20, is a rotatable bushing 23 having an opening 24 therethrough which is eccentric with respect to the axis of the bushing. Mounted in and extending through the opening 24 so as to be freely rotatable therein is a shaft 25 on the inner end of which is mounted a relatively large worm wheel 26 which is adapted to be brought into engagement with the lead screw 27 of the lathe and on the outer end of said shaft 25 there is mounted a toothed wheel 28 disposed in vertical alinement with the toothed wheel 17 on the cross feed spindle 14. Disposed between the worm wheel 26 and one end of the bushing 23 and between the toothed wheel 28 and the other end of the bushing are thrust washers 29.

Trained over the toothed wheels 17 and 28 is a flexible positive drive belt 30 of any preferred form, herein shown as a sprocket chain, which when the shaft 25 is in its lowermost position with respect to the axis of the bushing 23 will be tensioned and which when the bushing 23 is rotated to bring the shaft 25 in its upper position, that is when the worm wheel 26 is brought into engagement with the lead screw 27, the drive belt 30 will have its tension relaxed. Notwithstanding its relaxed condition, the belt 30 in view of its positive drive relation with the toothed wheels 17 and 28 will drive the toothed wheel 17 to rotate the cross feed screw 15. However, in order to insure a more positive drive and to take up the slack in the belt drive I may mount on the apron 12 a rotatable toothed wheel 31 carried on a headed screw 32 which is slidable and adjustable by a clamping nut 34 in a slot 33 in said apron.

For rotating the bushing 23 to selectively move the worm wheel 26 into and out of engagement with the lead screw 27, I attach to the bushing an angular lever 35 which extends laterally and upwardly with respect to the apron 12, said lever having its upwardly extending portion 35' overlying the face of the apron. Said lever 35 intermediate its ends is provided with a knob or operating handle 36. To hold the worm wheel in meshing or disengaged relation with the lead screw, it is merely necessary to tighten one of the bolts 22 to clamp the bushing within the bearing block 19, 20. Carried by the apron adjacent the extreme right edge thereof is a split nut 37 adapted to be selectively moved into and out of engagement with the lead screw 27 through an operating lever 38 in any well known manner, the operating lever being provided with an operating handle 38.

The relationship of the bushing rotating lever 35 and the split nut operating lever 38 is such that when the lever 35 is in its "on" position, as shown in Fig. 1, that is when the worm wheel 26 is in mesh with the lead screw 27, the free end of the lever component 35' will abut against the split nut operating lever 38 which will be in its "off" position, thus insuring that when the cross feed drive is in operation, the longitudinal feed drive of the lathe is inoperative. It will also be apparent that when the lever 35 is moved downwardly to its "off" position to disengage the worm wheel from the lead screw, it will then be possible to move the lever 38 downwardly to its "on" position to thereby engage the split nut 37 with the lead screw to cause longitudinal travel of the tool carriage with respect to the lathe bed. It will also be noted that when the lever 38 is in its "on" position that the lever 35 will be precluded from movement to its "on" position and vice versa. Means thus provided for insuring against the power cross feed and the longitudinal feed of the carriage being operated simultaneously. Obviously, the levers 35 and 38 may be simultaneously in "off" position whereupon the cross feed may be manually operated.

To guard against any part of the machine parts being damaged in the event that any element of the power cross feed may jam, I prefer to form the sprocket chain 30 with at least two weakened links 40 by reducing the central thickness thereof as shown at 41 so that these will be the first to "give way". These links 40 are preferably so spaced apart that at any position at least one link will be free of either toothed wheel in each section of the chain between the toothed wheels. Said links are relatively cheap and are mounted to be readily replaced when the trouble has been remedied.

From the foregoing description it will be appreciated that the power cross feed means which I have devised is exceedingly simple in construction, that it can be readily applied to new lathe equipment as well as lathes which are not now equipped with a power cross feed, in that it is primarily only necessary to add the worm wheel and its bearing support to the lower flange of the tool carriage and to merely cut an opening in the cross feed carriage support for accommodating the toothed wheel for the chain drive.

It will accordingly be appreciated that while I have shown and described a simple and practicable power feed means, it is to be understood that I do not wish to be limited to the details of construction disclosed, since it will be apparent to one skilled in the art that certain changes may be made within the range of engineering skill without departing from the spirit of the invention.

What I claim is:

1. A lathe or the like, comprising in combination, a lead screw, a tool carriage having a cross feed spindle and a rotatable shaft in parallel spaced relation to the cross feed spindle, a rotatable bushing in which the shaft is eccentrically mounted, a worm wheel on said shaft adapted to be selectively moved into and out of engagement with the lead screw as the bushing is rotated, and drive belt means for transmitting rotation of the shaft to the cross feed spindle when the worm wheel is rotated by the lead screw.

2. A lathe or the like comprising in combination, a lead screw, a tool carriage having a cross feed spindle and a rotatable shaft in parallel spaced relation to the cross feed spindle, a rotatable bushing in which the shaft is eccentrically mounted, a worm wheel on said shaft adapted to be selectively moved into and out of engagement with the lead screw as the bushing is rotated, a split nut supported by the carriage adapted to be selectively moved into and out of engagement with the lead screw, positive drive belt means for transmitting the rotation of the shaft to the cross feed spindle when the worm wheel is rotated by the lead screw and separate control means for moving the bushing and for moving the split nut, said control means being so related that when either control means is in "on" position the other control means will be held in "off" position.

3. A lathe or the like comprising in combination, a lead screw, a tool carriage having a cross feed spindle and a rotatable shaft in parallel spaced relation to the cross feed spindle, a rotatable bushing in which the shaft is eccentrically mounted, a worm wheel on said shaft adapted to be selectively moved into and out of engagement with the lead screw as the bushing is rotated, a split nut supported by the carriage adapted to be selectively moved into and out of engagement with the lead screw, positive drive belt means for transmitting the rotation of the shaft to the cross feed spindle when the worm wheel is rotated by the lead screw, and separate manually operable control levers for moving the bushing and for moving the split nut, said control levers being so related that when either is in "on" position a part thereof will engage the other control lever to prevent it from being also placed in "on" position.

4. A lathe or the like comprising in combination, a lead screw, a tool carriage having a cross feed spindle mounted for rotation therein, said tool carriage having a depending apron, a split bearing supported by said apron, a rotatable bushing having an eccentric opening therethrough mounted in said bearing, a rotatable shaft extending through said opening, means for clamping said bushing against rotation, a worm wheel on said shaft adapted to be selectively moved into and out of engagement with the lead screw as the bushing is rotated, and flexible positive drive means for transmitting rotation of the shaft to the cross feed spindle when the worm wheel is rotated by the lead screw.

5. A lathe or the like, comprising in combination, a lead screw, a tool carriage having a cross feed spindle and a shaft in parallel spaced relation to the cross feed spindle, means for driving the shaft from the lead screw, drive belt means adapted to transmit rotation of the shaft to the cross feed spindle and manually operable means for selectively effecting such rotation of the cross feed spindle from the lead screw.

6. A lathe or the like, comprising in combination, a lead screw, a tool carriage having a cross feed spindle and a shaft in parallel spaced relation to the cross feed spindle, a worm wheel on said shaft adapted to be driven by the lead screw, flexible positive drive means adapted to transmit rotation of the shaft to the cross feed spindle and manually operable means for selectively moving the worm wheel into engagement with the lead screw for effecting such rotation of the cross feed spindle from the lead screw.

7. A lathe or the like, comprising in combination, a lead screw, a tool carriage having a cross feed spindle and a shaft in parallel spaced relation to the cross feed spindle, means for driving the shaft from the lead screw, a split nut supported by the carriage adapted to be selectively moved into and out of engagement with the lead screw, flexible positive drive means adapted to transmit rotation of the shaft to the cross feed spindle and separately manually operable control means for selectively effecting such rotation of the cross feed spindle from the lead screw and for moving the split nut, said control means being so related that when either is in "on" position, the other control means will be held in "off" position.

JACK ABEL.